Patented Apr. 30, 1935

1,999,998

UNITED STATES PATENT OFFICE 1,999,998

ANTHRAQUINONYL SELENOETHERS

Melvin A. Perkins, Milwaukee, Wis., assignor to E. I. du Pont de Nemours & Company, Wilmington, Del., a corporation of Delaware No Drawing. Application December 20, 1933, Serial No. 703,249

6 Claims. (Cl. 260—58)

This invention relates to the preparation of selenoethers of the anthraquinone series and more particularly to the preparation of new unsubstituted, mono- or di-substituted 1,1'- or 1, 2'-anthraquinonyl-selenoethers and to a new process for producing selenoethers generally.

In my copending U. S. patent application Ser. No. 662,999, filed March 27, 1933, there are described anthraquinonyl-selenoethers which are characterized by two anthraquinone nuclei, substituted or unsubstituted, joined together by one selenium atom in the beta positions. They are formed by heating selenium with a halogen-anthraquinone compound in a solvent and due to this method of formation must necessarily possess a symmetrical configuration.

It is an object of this invention to provide a new and improved process for the preparation of selenoethers of the anthraquinone series which is wider in application than the process heretofore described. It is a further object of this invention to produce new and useful 1,1'-anthraquinonyl-selenoethers and 1,2'-selenoethers in which the anthraquinone nuclei may be unsubstituted or may contain the same or different substituents.

According to the present invention, anthraquinone selenols, diselenides or alkali-metal selenolates are condensed with halogen-anthraquinone compounds by heating them together in a suitable solvent and in the presence or absence of an acid binding agent and a catalyst. The selenoether is obtained directly by filtering off and freeing of solvent and inorganic salts by known methods. In this process, symmetrical selenoethers are produced when the anthraquinone selenol, diselenide or selenolate and the halogen-anthraquinone contain the selenium and halogen in similar positions and are either not further substituted or contain similar substituents in corresponding positions respectively in the anthraquinone nuclei. The unsymmetrical selenoethers are produced when the two reacting compounds are not similarly substituted or when the selenium and the chlorine of the two reacting bodies are not in similar positions in the anthraquinone nuclei.

In carrying out this reaction, the use of approximately molecular proportions of the two reactants is preferred, although an excess of either is not detrimental.

Without any intention of being limited thereby, the following specific examples are given to more fully illustrate the principles of my invention. The parts used are by weight.

*Example 1.—Preparation of an unsubstituted, symmetrical anthraquinone selenoether*

5.7 parts of 1,1'-dianthraquinonyl diselenide (prepared, for example, by air oxidation of the reaction product of sodium selenide and 1-chloroanthraquinone) and 4.8 parts of 1-chloroanthraquinone are mixed and introduced into 80 parts of molten naphthalene containing 2 parts of anhydrous sodium acetate and 0.1 parts of copper powder. The mixture is heated to about 220–225° C. for about 10 hours, then cooled to 150° C., drowned in 300 parts of solvent naphtha, cooled to room temperature and filtered. The dark orange residue is washed with solvent naphtha, alcohol and water, in turn, and dried. When dry, the product is an orange powder containing one atomic proportion of selenium. It yields an intensely colored (orange-brown) hydrosulphite vat, but has practically no affinity for cotton fiber. It gives a bright pea-green coloration in sulphuric acid (original diselenide gives an orange coloration), which quickly turns to yellow.

*Example 2.—Preparation of a symmetrically substituted anthraquinone selenoether*

6.0 parts of 2,2'-dimethyl-1,1'-anthraquinonyl diselenide (obtainable from 1-chloro-2-methylanthraquinone by treatment with alkali selenide, and salting, filtration, and air oxidation of the rather unstable alkali-selenolate which is formed), 5.1 parts of 1-chloro-2-methyl-anthraquinone, 2 parts of sodium acetate (anhydrous) and 0.1 parts of copper powder are added to 80 parts of molten naphthalene and the mixture further heated to reflux for about 6 hours.

A dark brown solution is obtained. This solution is drowned in 300 parts of solvent naphtha, the mixture cooled, and the brown solid product isolated in the usual manner. The dry product gives a grass-green coloration in sulphuric acid and contains 15.47% selenium (theory for selenoether—Se=15.2%).

*Example 3.—Preparation of an unsymmetrically mono-substituted α, β'-anthraquinone selenoether*

6 parts of 2-anthraquinone selenol (obtainable by acidification of the reaction product of potassium selenide and 2-bromo-anthraquinone), 7.5 parts of 1-chloro-4-benzoylamino-anthraquinone, 3.0 parts of anhydrous sodium acetate, and 0.1 parts of copper powder are mixed and introduced into 100 parts of molten naphthalene.

The mixture is further heated to reflux for at least five hours, cooled slightly, diluted with solvent naphtha and filtered while still warm. The dark red solid is isolated as usual. It may be purified, for example, by vatting, filtration, and aeration of the deep red vat. There is thus obtained a fairly bright red solid which dissolves in concentrated sulphuric acid with a brown color and dyes cotton from a dark red vat a very yellowish-red shade of good strength.

*Example 4.—Preparation of an unsymmetrical β, β'-selenoether*

6.0 parts of 1,1'-diamino-6,6'-dianthraquinonyl-diselenide (prepared, for example, by air oxidation of the reaction product of 1-amino-6-chloro-anthraquinone and sodium selenide) and 5.8 parts of 2-bromo-anthraquinone are stirred into 80 parts of molten naphthalene containing 2 parts of anhydrous sodium acetate, and the mixture refluxed for 15 to 20 hours. After cooling slightly, the mixture is diluted with solvent naphtha and filtered while still warm (50–60° C.). The residue is washed in turn with solvent naphtha, alcohol, and water. A rich, red-brown solid is obtained in good yield. It gives an intense, bright green coloration when dissolved in sulphuric acid. It vats readily, giving a brown-orange solution from which cotton is dyed in weak yellowish-red shades.

*Example 5.—Preparation of an unsymmetrical disubstituted α, β'-selenoether*

60 parts of 2,2'-dimethyl-1,1'-dianthraquinonyl diselenide, 72 parts of 1-benzoylamino-6-chloroanthraquinone, 20 parts of calcium hydroxide and 1 part of copper powder are introduced, with stirring, into 100 parts of tetrahydronaphthalene and the mass heated to 200–205° C. for about ten hours. At the end of this time the mass is allowed to cool, then is filtered and the residue washed successively with solvent naphtha, alcohol and hot dilute hydrochloric acid. A dark brown solid is obtained. It yields a dark greenish-brown coloration in sulphuric acid. Its vat is brown and cotton is dyed therefrom in brownish-yellow shades.

By this invention even the diselenides are converted into valuable selenoethers, which are of value as vat dyestuffs and which yield dyeings of yellow, brown, or red shades from brown, red-brown or dark red vats. It furthermore provides a method for preparing unsymmetrically substituted anthraquinonyl selenides which are difficult or impossible to obtain by other methods.

When the anthraquinonyl selenolate is used in the reaction, the addition of acid binding agents is of course not necessary since the alkali-metal present in the selenolate is sufficient to take up the halogen liberated in the reaction. With a diselenide or selenol the use of an acid binding agent is preferred. Although not an essential in carrying out this reaction a catalyst may be employed to speed up the reaction and to permit the process to be carried out at lower temperatures. Any solvent may be used which will dissolve at least one of the reactants and which will not itself enter into the reaction under the conditions used. Solvents which have a boiling point sufficiently high to permit the use of temperatures of from 200 to 225° C. are preferred, although lower boiling solvents may be used by increasing the time of the reaction.

Either the bromo or chloro anthraquinone compounds may be used in this reaction.

In the following claims the terms "a halogen anthraquinone", an "anthraquinonyl selenol", an "anthraquinonyl selenolate" or an "anthraquinonyl diselenide" are used to indicate these compounds in either the substituted or unsubstituted form.

I claim:

1. In the preparation of anthraquinonyl selenoethers, the step which comprises heating a halogen-anthraquinone compound with a compound of the group consisting of an anthraquinone selenol, an anthraquinone selenolate and an anthraquinone diselenide.

2. In the preparation of anthraquinonyl selenoethers, the step which comprises heating a halogen-anthraquinone compound with a compound of the group consisting of an anthraquinone selenol, an anthraquinone selenolate and an anthraquinone diselenide in the presence of a high boiling solvent.

3. In the preparation of anthraquinonyl selenoethers, the step which comprises heating a halogen-anthraquinone compound with a compound consisting of an anthraquinone selenol, and an anthraquinone diselenide in the presence of a high boiling solvent and an acid binding agent.

4. A di-anthraquinonyl-selenoether.

5. An α, β'-anthraquinonyl-selenoether.

6. An α, α'-anthraquinonyl-selenoether.

MELVIN A. PERKINS.